United States Patent
Cheng et al.

(10) Patent No.: US 7,590,804 B2
(45) Date of Patent: Sep. 15, 2009

(54) PSEUDO LEAST RECENTLY USED REPLACEMENT/ALLOCATION SCHEME IN REQUEST AGENT AFFINITIVE SET-ASSOCIATIVE SNOOP FILTER

(75) Inventors: Kai Cheng, Portland, OR (US); David C. Lee, Beaverton, OR (US); John A. Urbanski, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 317 days.

(21) Appl. No.: 11/168,703

(22) Filed: Jun. 28, 2005

(65) Prior Publication Data

US 2006/0294314 A1    Dec. 28, 2006

(51) Int. Cl.
    G06F 12/00    (2006.01)

(52) U.S. Cl. ...................................................... 711/137
(58) Field of Classification Search .................... None
    See application file for complete search history.

(56) References Cited

U.S. PATENT DOCUMENTS 6,704,845 B2 *  3/2004  Anderson et al. ........... 711/146
6,857,048 B2 *  2/2005  Rankin et al. ............... 711/133

* cited by examiner

*Primary Examiner*—Brian R Peugh
(74) *Attorney, Agent, or Firm*—Caven & Aghevli LLC

(57) ABSTRACT

The storage locations of a snoop filter are segregated into a number of groups, and some groups are associated with some processors in a system. When new data enter a cache line of a processor, one of the storage locations associated with the processor is selected for further operations.

14 Claims, 5 Drawing Sheets

PSEUDO LEAST RECENTLY USED REPLACEMENT/ALLOCATION SCHEME IN REQUEST AGENT AFFINITIVE SET-ASSOCIATIVE SNOOP FILTER

FIELD OF THE INVENTION

The invention relates to cache coherency in shared-memory systems. More specifically, the invention relates to improved resource allocation in a subsystem for enhancing cache coherency performance.

BACKGROUND

Users of computer systems constantly demand improved performance, and designers of circuits and systems respond with a variety of techniques to speed calculations. Two techniques that have had good success are caching and multiprocessing.

Caching is the practice of storing a copy of data in a location from which it can be retrieved more quickly than by reference to the place from which the data was copied. For example, information may be stored in the main memory of a system with a copy cached in a processor cache, because the processor can usually access information in its internal cache faster than it can obtain the same information from main memory. In some systems, more than one level of cache may be provided, with each level permitting access that is improved in some way over outer levels. The cache that is furthest from the processor in the cache hierarchy, or closest to the main memory, is called the "last level cache." The closer a cache is to the processor, the smaller it tends to be. For example, a central processing unit ("CPU") may have an innermost level one ("L-1") cache internal to the processor, and larger, slower level two ("L-2") and level three ("L-3") caches fabricated on the same die. In this example, the outer L-3 cache is the last level cache.

All caching schemes must take precautions to ensure that the cached copies are consistent with the original data; that is, they must prevent the use of old, outdated, or "stale" cached copies when the original data has changed.

A multiprocessor system has two or more processors that operate independently, but share some memory and other resources. Some individual processors add another level of multiprocessing by operating on two or more separate instruction streams within each "core" of the processor; this is commonly called "hyper-threading." Each processor in a multiprocessor system must provide for synchronization to manage contention for, and to prevent corruption of, shared resources.

When caching is combined with multiprocessing in, for example, a multiprocessor system where some processors include an internal cache memory, the normal problem of ensuring consistency between a processor's cache and the contents of main memory is complicated by the requirement that all processors maintain a consistent view of shared data in main memory. This problem has been addressed by a device known as a "snoop filter," which is a performance enhancing feature that helps reduce unnecessary snoops onto remote front side buses ("FSBs"). The snoop filter resides logically between the processors and the shared memory and monitors the operations of the processors to maintain a database of memory locations whose contents may be held in a cache of one or more processors.

Snoop filter operations are critical to the correct and efficient operation of a multiprocessor system. If a snoop filter fails to detect that a processor has cached a copy of certain data, then it is possible for that processor to operate on stale data (with potentially disastrous results). On the other hand, a snoop filter that tracks a lot of stale cache lines which are no longer present in a processor's cache will rob the system of performance improvements that the cache could have provided.

Current snoop filters operate by maintaining a coherent directory relating shared memory addresses to the one or more processors in the system that may have cached data at those addresses. Since this directory is usually of fixed size, the entries are a limited resource for which the processors may contend. In particular, when one or more of the processors in a system are engaged in memory-intensive operations that frequently cause new data to be loaded into the processors' caches, the snoop filter can quickly become full. Once full, each new cache fill may require the snoop filter to evict an existing entry so that it can store information about the new cache entry. When an entry is evicted, the snoop filter sends a "back-invalidation" signal to all connected processors, causing them to evict any data from the old address. If any of the processors were still using that data, they will have to reload it before continuing. These cache reloads will consume front-side bus bandwidth may cause additional snoop filter entry evictions with their associated back-invalidation signals. In extreme cases, the system can begin thrashing: most bus cycles and processing time are consumed by cache invalidations and subsequent reload operations.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF DRAWINGS

Figure 1:
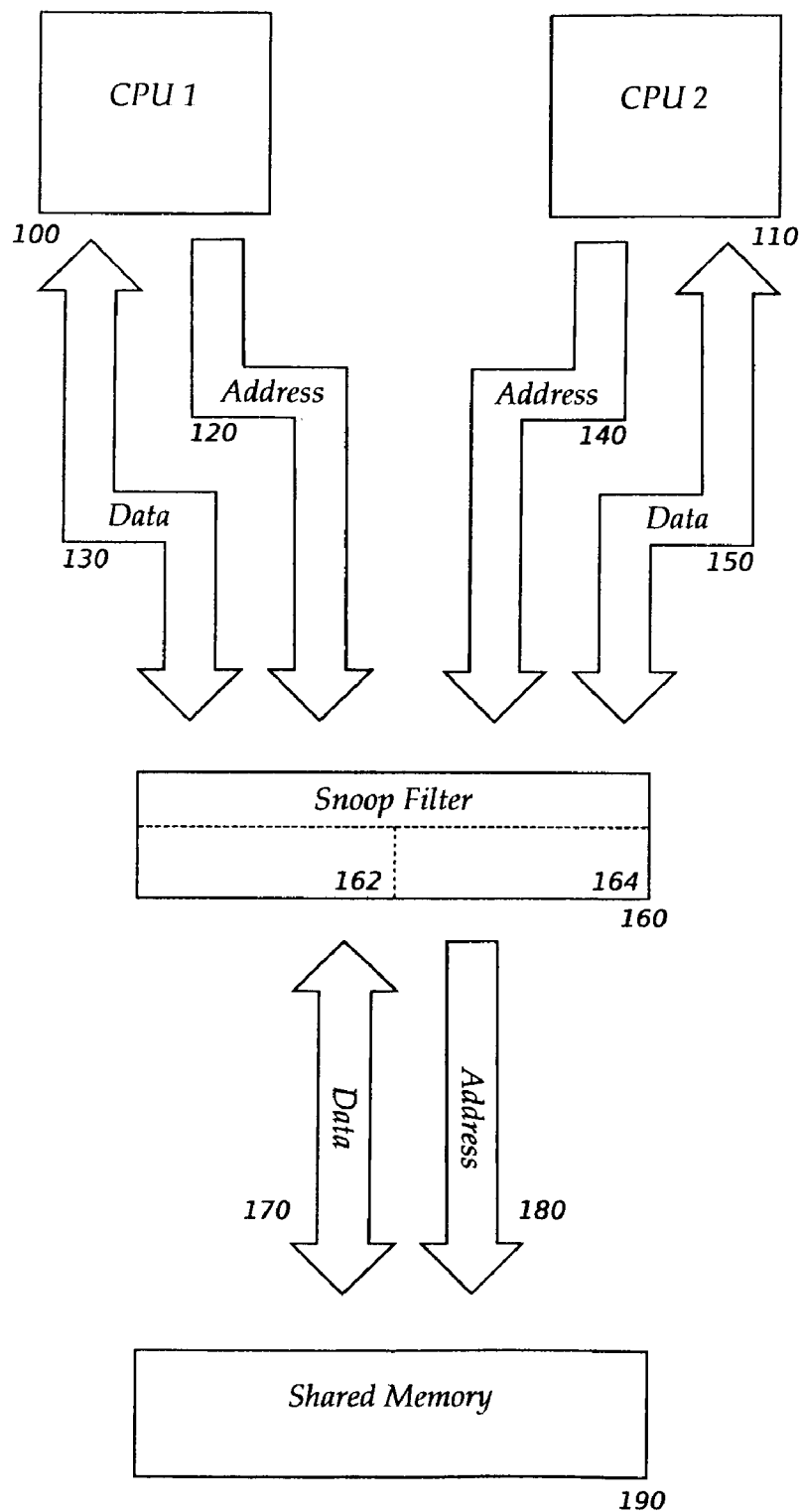
FIG. 1 is a block diagram of a system including one embodiment of the invention.

FIG. 1 shows a logical relationship between a snoop filter, 160, and other components of a multiprocessor system. CPU1, 100, transmits addresses over address bus 120 and exchanges data over data bus 130, while CPU2, 110, transmits addresses over a similar address bus 140 and exchanges data over data bus 150. Shared memory 190 receives memory addresses over address bus 180 and exchanges data corresponding to the addresses over data bus 170. Snoop filter 160 is shown as terminating address buses 120 and 140 and data buses 130 and 150, and sourcing independent address and data buses 170 and 180, but this arrangement is not essential to embodiments of the present invention. Other bus contention management schemes may be employed to permit CPU1, 100, and CPU2, 110, to access shared memory 190 without interference from each other (or other components, not shown). Snoop filter 160 needs only sufficient access to the various address and data buses to detect when each CPU is interacting with shared memory 190, and to obtain information about the memory cycle (such as the address requested and the direction of data transfer).

In an embodiment of the invention, snoop filter 160 may be logically partitioned into sub-sections, each dedicated to zero, one, or more than one of the processors in the system for some purposes. Since there are two CPUs in FIG. 1, snoop filter 160 might be partitioned into sub-sections 162 and 164, with sub-section 162 dedicated to CPU1 100 and sub-section 164 dedicated to CPU2 110. In systems with more processors, the number of sub-sections can be scaled accordingly. This logical partitioning can help alleviate resource pressure and contention for snoop filter entries.

Figure 2:
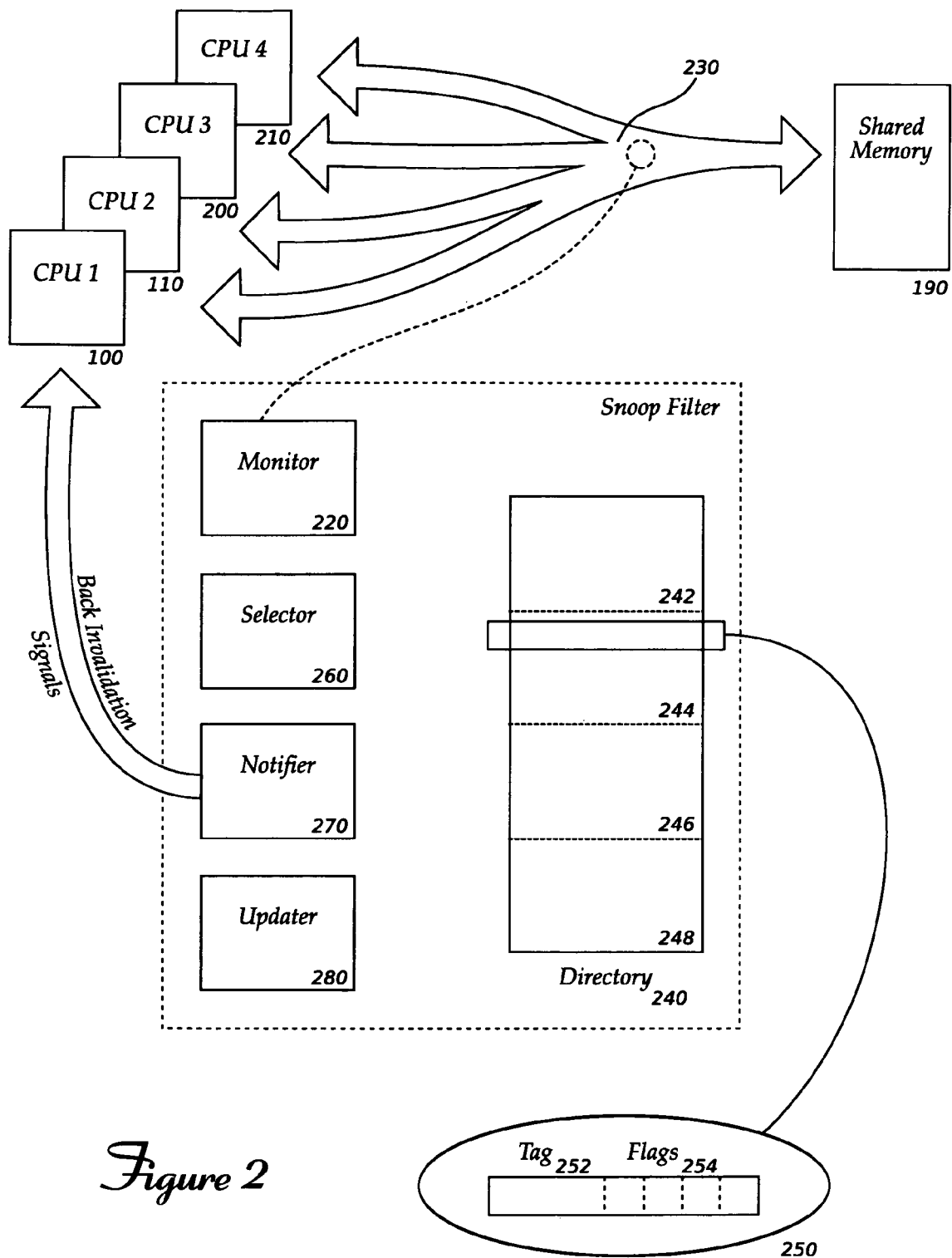
FIG. 2 is an expanded block diagram of the components of a snoop filter according to an embodiment of the invention.

FIG. 2 shows an expanded block diagram of the snoop filter represented at element 160 of FIG. 1. Monitor 220 observes activity on the address and data buses 230 that carry information between the processors 100, 110, 200, 210 in the system and the shared memory 190 to detect when a processor fills one of its cache entries with new data from shared memory. When new data enters the cache of one of the processors, the monitor notes the shared memory address associated with the data and makes a portion of the address available to other parts of the snoop filter as an identifier to identify the data in the cache. The identifier may be the same as the "tag" a processor typically uses to identify the data in its cache.

When the monitor detects that new data has entered a processor's cache, the snoop filter undertakes a series of operations to update its directory 240 to show that data from the shared memory address was cached by the processor. Directory 240 contains a number of storage locations, segregated into several subsets 242, 244, 246 and 248 (a sample storage location is shown in inset 250). Each processor is associated with a subset, so that there is a group of entries from which an entry can be chosen when the processor caches new data. Some subsets may not be associated with a processor at all, but may instead be used for other purposes. Other subsets may be associated with more than one processor. This latter arrangement may be beneficial if there is some reason why the associated processors would not contend with each other for use of entries in the subset. Each storage location contains at least an identifier 252 to indicate the address in shared memory from which the data was copied and thereby identify an entry in a cache of a processor, and flags 254 to indicate which of the processors may have cached data corresponding to that identifier.

Selector 260 selects one of the storage locations from the subset associated with the processor detected by monitor 220 according to an algorithm discussed below. If the selected storage location had previously been in use, notifier 270 will send back-invalidation signals to some of the processors. Notifier 270 will signal at least the processor detected by the monitor, which is likely to be the processor associated with the subset from which the storage location was selected. In some cases, the notifier 270 will also signal a second processor besides the processor detected by the monitor; this second processor will not be associated with the subset from which the storage location was selected.

After any necessary notification signals are sent, updater 280 will modify the selected entry to ensure that it contains the information the snoop filter stores. For example, updater 280 may store the identifier of the newly-cached data in the selected entry, and may set the entry's flags to indicate that the processor detected by the monitor loaded data corresponding to the identifier into its cache. Updater 280 may also store information in other fields of the selected entry (other fields not shown in this figure).

Figure 3:
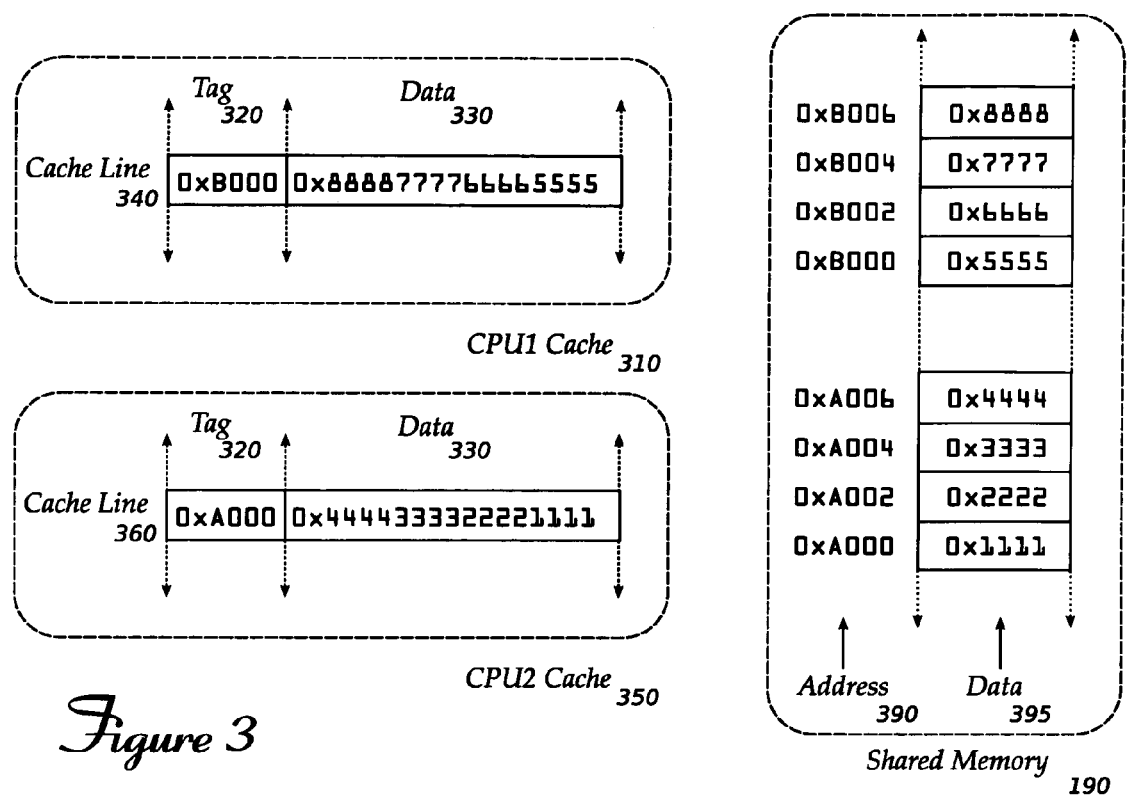
FIGS. 3 and 4 are content diagrams showing possible states of two CPU caches and a corresponding snoop filter directory at a point in the operation of a multiprocessor system.

FIG. 3 shows a portion of the caches of two CPUs (CPU1 cache 310 and CPU2 cache 350) and a portion of shared memory 190. A cache consists of a number of entries called "cache lines." One cache line is shown for each of CPU1 cache 310 and CPU2 cache 350. Each cache line includes fields for tag 320 and data 330. The tag field contains a portion of a shared memory address that permits the CPU to determine which shared memory locations the cached data came from. The complete shared memory address is indicated in the figure as address 390. The data field 330 of each cache line contains a copy of data from shared memory 190 (data in the shared memory is indicated in the figure as data 395). Cache line 340, in CPU1 cache 310, contains eight bytes of data copied from shared memory addresses 0xB000 through 0xB007, as indicated by the tag 0xB000; while cache line 360, in CPU2 cache 350, contains eight bytes of data copied from shared memory addresses 0xA000 through 0xA007 (as indicated by the cache tag 0xA000). CPUs that use cache lines containing more or fewer data bytes can also be accommodated by embodiments of the invention.

Figure 4:
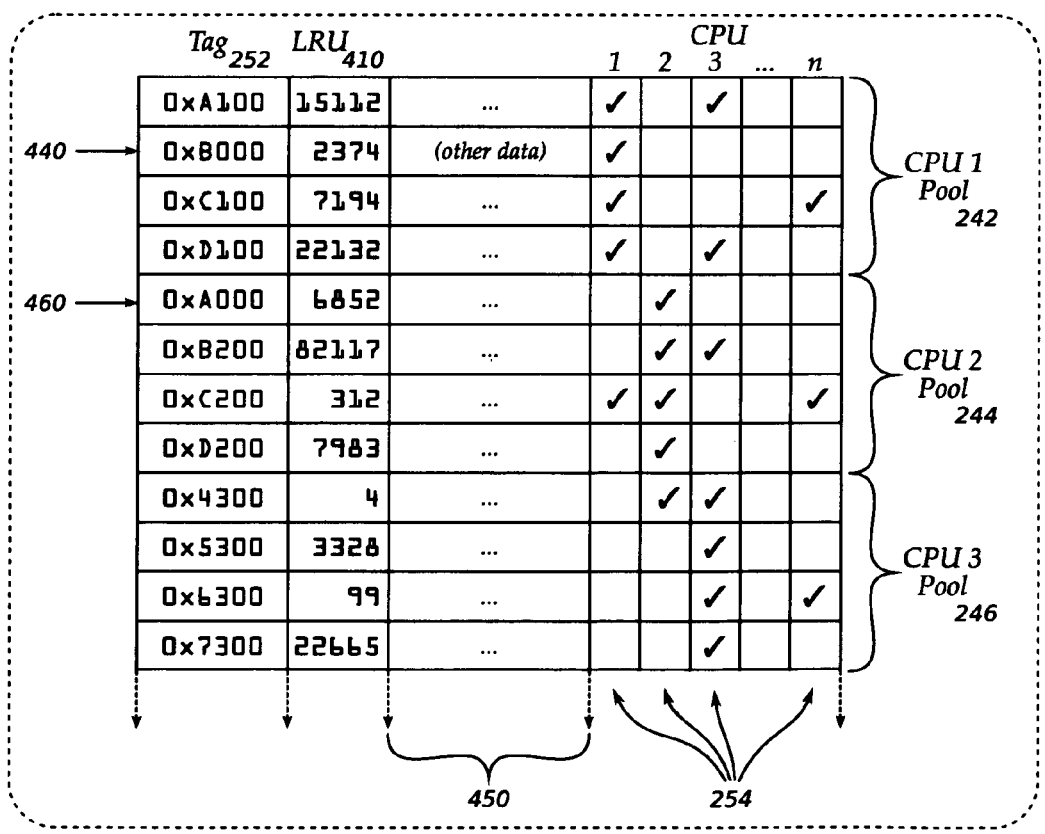

FIG. 4 shows sample snoop filter directory contents. As discussed in reference to element 240 of FIG. 2, the directory contains a number of snoop filter entries, each storing an identifier or "tag" 252 and a number of flags 254 to indicate which CPU(s) may have cached the data at the shared memory address corresponding to the tag. Each of the snoop filter entries shown in FIG. 4 also includes a least-recently used ("LRU") field 410, the operation of which will be described below. Other per-entry information may also be stored as suggested by column 450. As shown by brackets 242, 244, 246 and 248, entries in the snoop filter directory are segregated into groups or subsets, and each subset is associated with one of the processors in the system.

Entries 440 and 460 in the snoop filter directory correspond to the cache lines shown as elements 340 and 360 in FIG. 3. Entry 440 connects tag 0xB000 with CPU1, thereby indicating that CPU1 loaded data from shared memory address 0xB000 into one of its cache lines (specifically, cache line 340 in FIG. 3). Similarly, entry 460 connects tag 0xA000 with CPU2.

Figure 5:
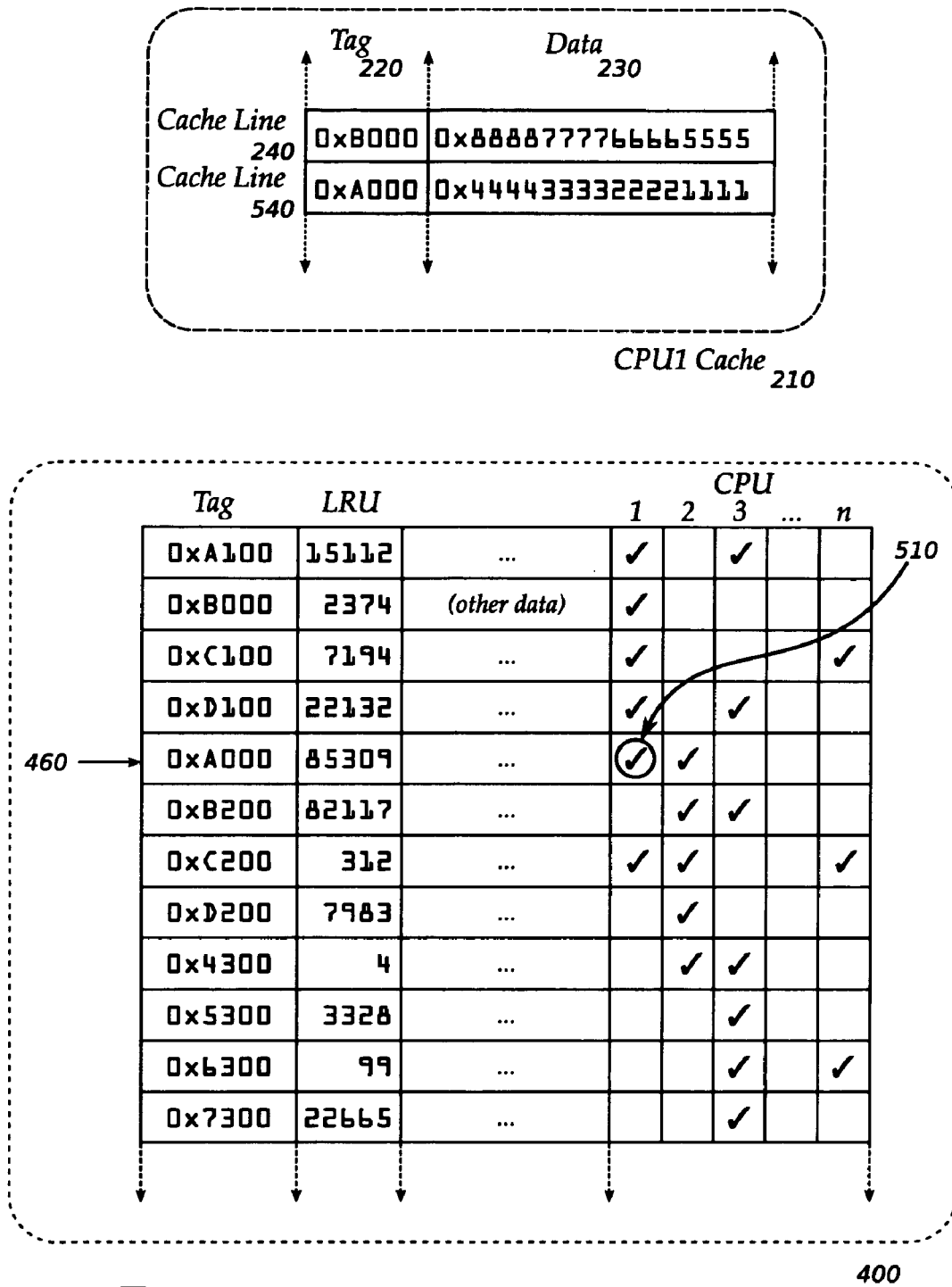
FIG. 5 shows how an operation of one of the CPUs in the multiprocessor system of FIGS. 3 and 4 may affect the CPU's cache and snoop filter's directory.

FIG. 5 shows how CPU1's cache and the snoop filter's directory might change if the snoop filter detected CPU1 filling a cache line with data from shared memory addresses 0xA000 through 0xA007. Element 210 shows a portion of CPU1's cache. In particular, note that cache line 540 contains tag 0xA000 and eight bytes copied from shared memory. Filter entry 460 in snoop filter directory 400 has also been updated: element 510 shows that the entry now connects tag 0xA000 with both CPU1 and CPU2. Since entry 460 is part of the group that is dedicated to CPU2, the entry is shared with CPU1. Also in entry 460, note that the LRU field has been updated to show that a processor (CPU1 in this case) recently loaded data corresponding to tag 0xA000 into its cache.

Figure 6:
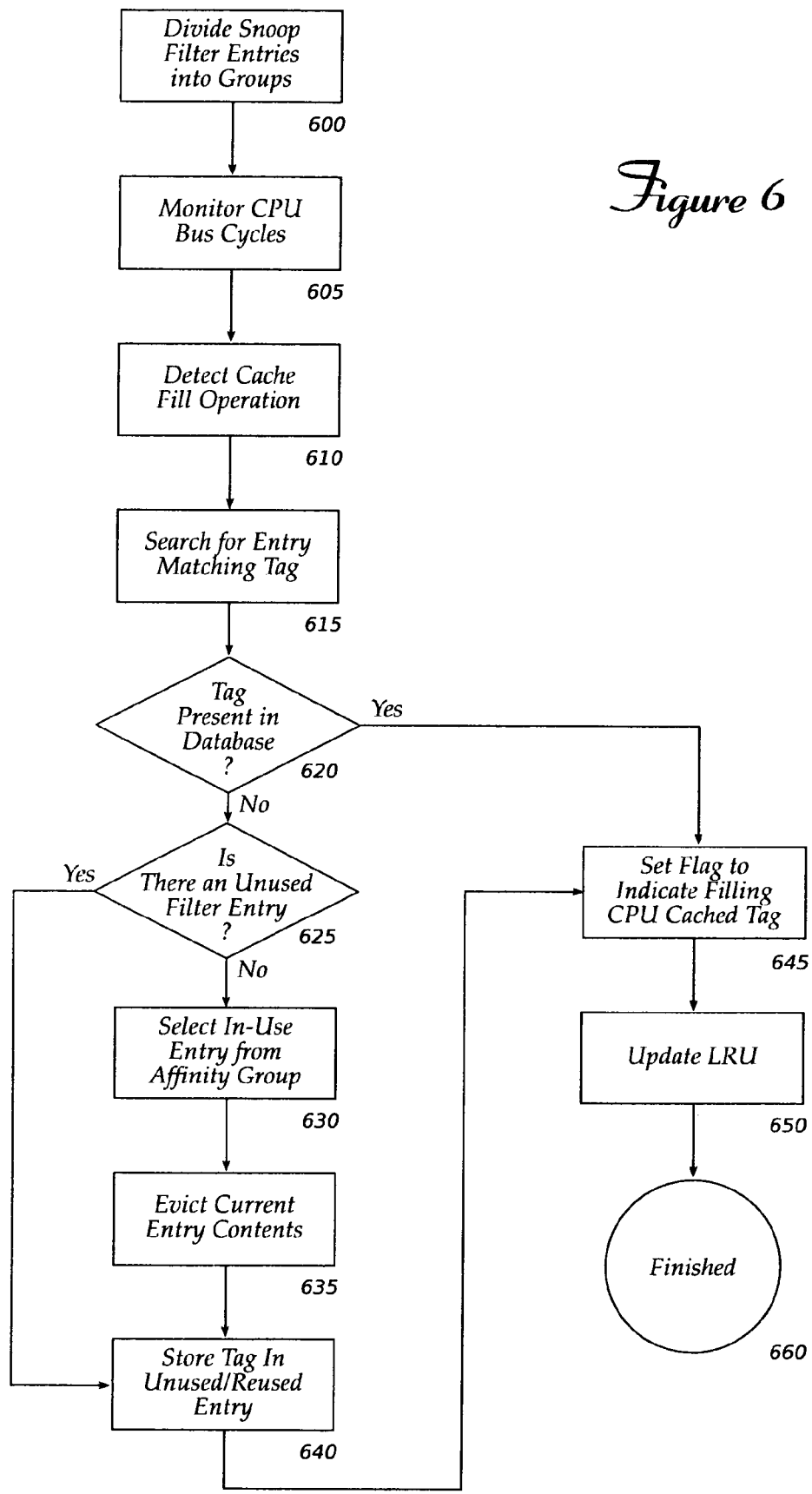
FIG. 6 is a flowchart showing operations of a snoop filter according to an embodiment of the invention.

FIG. 6 is a flow chart describing the operation of a snoop filter according to an embodiment of the invention. At block 600, the entries in the snoop filter directory are divided into a number of groups, and groups are dedicated to corresponding groups of zero, one, or more than one of the processors in the system. (Processors that have no cache memory need not be associated with a group.) This segregation of entries into groups or subsets and association of groups with processors may be done as part of the configuration or initialization of the system. Alternatively, some embodiments may permit entries to be moved from one group to another during normal system operations. The group of snoop filter entries associated with a processor is called the processor's affinity group.

Once affinity groups have been established, the snoop filter monitors the processors' bus cycles (605). When the snoop filter detects data from a shared memory being placed into a cache line of a processor (a "cache fill" operation, 610), it remembers the shared memory address of the data as a "tag" or identifier for use in the remainder of the method.

Next, the snoop filter searches for an entry in its directory that matches the tag (615). If such an entry is found (620), the entry is updated as necessary to reflect the cache fill operation detected at 610. For example, a flag in the matching entry will be set to indicate that the processor detected at 610 loaded data corresponding to the tag (645). (The entry is already known to contain the tag, because that is how it was located at block 615.) Other information in the matching entry (for example, the contents of the LRU field) may also be updated at this time (650). If the entry with the matching tag is part of a group dedicated to a different processor, then setting the flags as described in block 645 causes the entry to be shared with the cache-filling processor.

If no entry matching the tag is found, the snoop filter searches for an unused filter entry within the processor's affinity group (625). If an unused entry is found, the tag is stored in the entry (640), the entry's flags are set appropriately (645), and other entry fields (such as the LRU field (650)) may be filled.

If there are no unused entries within the processor's affinity group, one of the in-use entries must be selected (630). Several mechanisms for performing the selection are discussed below. For the purposes of this flow chart, it is sufficient to assume that, after block 630, one of the entries from the subset that is associated with the processor has been selected.

Before the selected entry can be used to store information related to the newly-detected cache fill operation, its current contents must be evicted (635). Eviction includes sending a signal at least to the cache-filling processor itself, to cause the processor to back-invalidate any cache line having a tag that matches the (old) tag in the selected snoop filter entry. If the selected entry contains flags indicating that other processors may also have cached data corresponding to the old tag, a signal is sent to those processors as well, causing them to back-invalidate any cache line having a tag that matches the old tag in the snoop filter entry.

Finally, the entry can be reused by storing the new tag (640), setting its flags to indicate the cache-filling CPU (645), and updating any other fields (such as the LRU field (650)).

In some embodiments of the invention, the snoop filter can detect when a CPU evicts data in one of its cache lines. When this is possible, the snoop filter can update its entry corresponding to the tag of the evicted data to show that the evicted data is no longer present in the cache line of the CPU.

In some embodiments of the invention, the snoop filter directory will contain at least as many storage locations for filter entries as there are cache entries in all of the processors in the system. In some embodiments, subsets of directory entries will be sized so that each subset is at least as large as the number of last-level cache entries in the processor to which the subset is dedicated. These configurations are favorable because the snoop filter effectively limits the amount of data that can be held in a processor's last-level cache. To see why this is so, consider a snoop filter which allocates only ten entries to a CPU which has twenty lines in its last-level cache. After the CPU has filled ten of its cache lines, subsequent fills will often force the snoop filter to reallocate one of its entries to accommodate the new cached data. The reallocation will cause a back-invalidation signal to be sent to the CPU, and one of the entries in its cache will be discarded. Therefore, ignoring snoop filter entries that may be shared with other processors, the snoop filter will not permit the CPU to fill more cache lines than the snoop filter has entries dedicated to the CPU.

The process of selecting a snoop filter entry in which to store information about data entering a cache line of a processor has been mentioned several times. The following paragraphs discuss the selection process in detail.

First, recall from the flow chart of FIG. 6 that if there is no snoop filter entry matching the tag of the detected cache fill, an entry is selected from the affinity group of the cache-filling processor (and not from a general pool of filter entries that may be allocated to any processor). Since each processor has its own affinity group from which to select entries, the processors no longer contend with each other for snoop filter entries. This can help reduce thrashing.

Next, note that an in-use entry need only be selected if there is no other entry that can be shared, and no unused entry available in the processor's affinity group. Because any current data in a selected entry must be evicted, and because eviction causes at least one back-invalidation signal to be sent, it is important to select an entry that may have a low chance of causing invalidation of cached data that is still in use.

One useful algorithm is a variant of a least-recently-used (LRU) algorithm. In a true LRU algorithm, the snoop filter would evict an entry corresponding to the cache line that had been inactive the longest in the processor that was performing a cache-line fill. However, the snoop filter may not have access to information about the processor's use of its cache lines. Instead, the snoop filter may only be able to observe the times when one of the processors loads data corresponding to a tag into its cache. These times may be stored with the filter entry as indicated in element 410 of FIG. 4.

The cache fill time is adequate to establish a use of the data corresponding to the tag, but may not be enough to establish the most recent use. Thus, using the cache fill time to select a snoop filter entry from the CPU's affinity group is effectively a pseudo-LRU algorithm that may permit the snoop filter to evict directory entries that are more likely than not already discarded from the processor's cache. In the best case, back-invalidation signals will not cause useful cache data to be purged. Note that some embodiments of the invention may consider only cache fills by the processor associated with a subset of filter entries in selecting a pseudo least recently used entry, while other embodiments may also acknowledge cache fills by other processors with which the filter entry is shared, by e.g. updating the LRU field responsive to a fill from a non-affiliated processor.

In other embodiments of the invention, snoop filter entries may be selected based on a round-robin algorithm, where (for example) each subset of filter entries has a pointer to indicate the next entry within the subset to be evicted; the pointer may be advanced in a circular fashion within the subset as entries are evicted.

Yet other embodiments of the invention may select snoop filter entries for eviction based on a function of the shared memory address or cache tag. For example, several bits of the address or tag could be selected and treated as an integer, divided by the number of entries in the associated subset of entries, and the remainder used to identify an entry within the subset.

In some systems, a snoop filter selection algorithm that mimics or emulates the cache line eviction algorithm used by the processor may provide superior performance (as measured by the number of back-invalidations that reference tags already discarded from the processor's cache). In such a system, then, the specific selection algorithm used by the snoop filter is not important, as long as it produces similar or identical results to the processor's own cache eviction algorithm.

Although many of the preceding discussions and examples have referred to two CPUs or processors in a multiprocessor system, the concepts and analyses apply equally to systems including greater numbers of processors. Thus, references to "a plurality of processors" or "at least one CPU" should be understood to mean "two or more," and not merely "two."

The applications of the present invention have been described largely by reference to specific examples and in terms of particular allocations of functionality to certain hardware and/or software components. However, those of skill in the art will recognize that improved snoop filter operations can also be produced by software and hardware that distribute the functions of embodiments of this invention differently than herein described. Such variations and implementations are understood to be apprehended according to the following claims.

We claim:

1. A method comprising:
    dedicating each of at least some snoop filter entries of a plurality of snoop filter entries in a snoop filter to one or more processors;
    detecting a placement of data into a cache line of a processor of the one or more processors (a detected cache fill), the detected cache fill being associated with a tag;
    if there is no snoop filter entry matching the tag of the detected cache fill, selecting a snoop filter entry from a subset of the plurality of snoop filter entries that includes snoop filter entries dedicated to the processor: and
    storing, in the selected snoop filter entry, an identifier of the data that was placed in the cache line of the processor.

2. The method of claim 1, further comprising:
    detecting an eviction of data in a cache line of a processor; and
    updating a snoop filter entry to reflect that the evicted data is no longer present in the cache line of the processor.

3. The method of claim 1, further comprising:
    back-invalidating a cache line of the processor having a tag that matches a tag of the selected snoop filter entry before performing the storing operation.

4. The method of claim 3, further comprising:
    back-invalidating a cache line of a second, different processor having a tag that matches a tag of the selected snoop filter entry before performing the storing operation.

5. The method of claim 1 wherein selecting a snoop filter entry is selecting a least-recently used snoop filter entry from the group that is associated with the processor.

6. The method of claim 1 wherein selecting a snoop filter entry is selecting a snoop filter entry according to a round-robin algorithm operating over the group that is associated with the processor.

7. A method comprising:
    dedicating each of at least some of a plurality of snoop filter entries to one or more processors;
    detecting that a first processor loads data into a cache line of the first processor;
    searching for a snoop filter entry that matches a tag of the data;
    if a matching snoop filter entry of a subset associated with a second, different processor is found, sharing the matching snoop filter entry with the first processor; and
    if a matching snoop filter entry of a subset associated with a second, different processor is not found, selecting a snoop filter entry from a subset of the plurality of snoop filter entries that includes snoop filter entries dedicated to the first processor, and storing a tag of the data in the selected snoop filter entry.

8. The method of claim 7 wherein selecting a snoop filter entry is selecting a least-recently used entry from among the entries comprising the subset.

9. The method of claim 7 wherein selecting a snoop filter entry is selecting a next entry from among the entries comprising the subset by an algorithm that produces similar results to an algorithm used by the first processor to evict cache line data.

10. The method of claim 7 wherein sharing the matching snoop filter entry comprises noting in the entry that the first processor has loaded data matching a tag of the entry into a cache line of the first processor.

11. A system comprising:
    one or more processors, at least one having a cache;
    a memory shared by the one or more processors; and
    a snoop filter having a plurality of snoop filter entries, and being logically partitioned into a number of subsections, each subsection dedicated to one or more processors that have a cache, and the snoop filter is operable to:
    detect a placement of data into a cache line of a cache at a processor of the one or more processors (a detected cache fill), the detected cache fill being associated with a tag;
    if there is no snoop filter entry matching the tag of the detected cache fill, select a snoop filter entry from a subset of the plurality of snoop filter entries that includes snoop filter entries dedicated to the processor; and
    store, in the selected snoop filter entry, an identifier of the data that was placed in the cache line of the processor.

12. The system of claim 11, wherein a filter entry that is dedicated to a first processor is shared with a second processor.

13. The system of claim 12, wherein a cache of the second processor is back-invalidated if the shared filter entry is evicted.

14. The system of claim 11, wherein the snoop filter is located between the one or more processors and the shared memory.

* * * * *